United States Patent
Li et al.

(10) Patent No.: US 8,577,601 B2
(45) Date of Patent: Nov. 5, 2013

(54) NAVIGATION DEVICE WITH AUGMENTED REALITY NAVIGATION FUNCTIONALITY

(75) Inventors: Wei-Tim Li, Taipei (TW); Lu-Ming Liu, Taipei (TW); Hung-Tai Shin, Taipei (TW)

(73) Assignee: Mitac International Corp., Taoyuan County (TW)

( * ) Notice: Subject to any disclaimer, the term of this patent is extended or adjusted under 35 U.S.C. 154(b) by 0 days.

(21) Appl. No.: 13/401,549

(22) Filed: Feb. 21, 2012

(65) Prior Publication Data

US 2012/0226437 A1  Sep. 6, 2012

(30) Foreign Application Priority Data

Mar. 1, 2011 (TW) .............................. 100106650 A

(51) Int. Cl.
G01C 21/00 (2006.01)
(52) U.S. Cl.
USPC ....................................................... 701/423
(58) Field of Classification Search
None
See application file for complete search history.

(56) References Cited

U.S. PATENT DOCUMENTS

| | | | | |
|---|---|---|---|---|
| 7,271,737 B1* | 9/2007 | Hoffberg | ...................... | 340/905 |
| 7,298,289 B1* | 11/2007 | Hoffberg | ...................... | 340/903 |
| 2010/0253595 A1* | 10/2010 | Szczerba et al. | ................... | 345/7 |
| 2010/0253598 A1* | 10/2010 | Szczerba et al. | ................... | 345/7 |
| 2010/0253599 A1* | 10/2010 | Szczerba et al. | ................... | 345/7 |

* cited by examiner

Primary Examiner — Thomas Tarcza
Assistant Examiner — Adam Alharbi
(74) Attorney, Agent, or Firm — Davidson, Berquist, Jackson & Gowdey, LLP

(57) ABSTRACT

A navigation device includes a display, a recording medium, a navigation camera, a global positioning system (GPS), and a processor. The processor is operable to determine a current position for generating a navigation route to a destination. Based on a real-time traffic image received from the navigation camera, the processor adjusts a display scale and a display position of the navigation route, superimposes the navigation route on the real-time traffic image to generate a superimposed image, and outputs the superimposed image for viewing on the display and storage in the recording medium.

11 Claims, 4 Drawing Sheets

NAVIGATION DEVICE WITH AUGMENTED REALITY NAVIGATION FUNCTIONALITY

CROSS-REFERENCE TO RELATED APPLICATION

This application claims priority of Taiwanese Application No. 100106650, filed on Mar. 1, 2011.

BACKGROUND OF THE INVENTION

1. Field of the Invention

The invention relates to a navigation device and more particularly to a navigation device with a navigation camera to offer augmented reality navigation functionality.

2. Description of the Related Art

Two types of image recording mediums are currently available in the navigation field. The first type is able to record images in front of a camera lens, the surrounding sound, and the recording time and date. The second type is able to further record global positioning system (GPS) coordinates, the vehicle speed, and the vehicle acceleration.

During playback of recorded information, the first type of the image recording medium is not able to show the vehicle speed and the coordinates. On the other hand, the second type of the image recording medium requires the software to have the connection between a navigation camera, a navigation device, and an audio receiver and a GPS receiver in order to show the captured images with the recording time and date, the vehicle speed and acceleration information, and an electronic map with GPS coordinates.

Although a conventional navigation device with a navigation camera includes a GPS module is not configured to provide the function of augmented reality navigation, and manual adjustment to the position of the navigation device is required when such function is needed. Users might need to repeatedly spend time to manually adjust the position of the device or fine tune the resolution of the display of the navigation information in order to match the display of the navigation information and the real-time traffic image that is captured by the navigation camera if any slight movement of the navigation device is made such as slightly tilting the navigation device under the normal operation including inputting the destination for generating a navigation route and corresponding navigation indications.

SUMMARY OF THE INVENTION

Therefore, an object of the present invention is to provide augmented reality navigation functionality with auto calibration to match at least a real-time traffic image captured by a navigation camera and the display of navigation information.

Accordingly, the navigation device with augmented reality navigation functionality of the present invention comprises a display, a recording medium, a navigation camera, a global positioning system (GPS) system, and a processor.

The navigation camera includes a camera lens and is operable to capture at least a real-time traffic image.

The GPS system is for receiving at least a GPS signal.

The processor is coupled electrically to the display, the recording medium, the navigation camera and the GPS system. The processor is operable to determine a current position based on the GPS signal, generate navigation information including at least a direction indicator according to a navigation route that leads to a destination, determine a reference point of the real-time traffic image received from the navigation camera, the reference point being associated with a depth of field of the real-time traffic image, determine viewing angle and a zoom scale of the real-time traffic image based on the reference point, determine a display scale and a display position of the direction indicator according to the viewing angle and the zoom scale of the real-time traffic image, superimpose the direction indicator on the determined display position of the real-time traffic image with the determined display scale to generate a superimposed image, output the superimposed image to the display, and store the superimposed image in the recording medium.

By virtue of the navigation device with augmented reality navigation functionality of this invention, manually matching the navigation camera and the display of the navigation information including manually adjusting the position of the navigation device or manually fine tuning the resolution of the display of the navigation information would not be necessary even if any movement of the navigation device is made under the normal operation of the navigation device such as inputting the destination.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
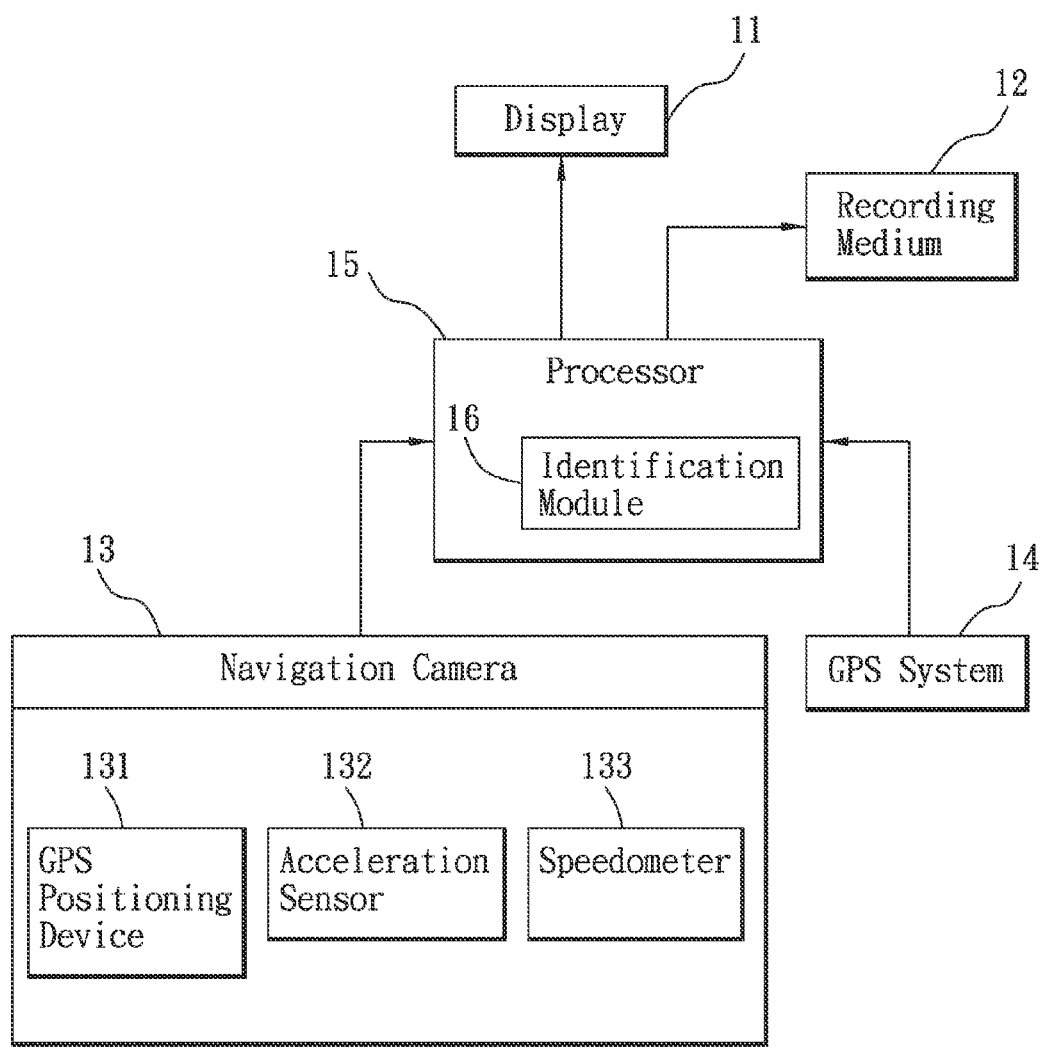
FIG. 1 is a block diagram illustrating a preferred embodiment of a navigation device with augmented reality navigation functionality of the present invention.

Referring to FIG. 1, the preferred embodiment of a navigation device with augmented reality navigation functionality of the present invention is to be installed in a vehicle to provide augmented reality navigation function. The navigation device includes a display 11, a recording medium 12, a navigation camera 13, a global positioning system (GPS) 14, and a processor 15.

The display 11 is a flat panel display such as a liquid crystal display. The recording medium 12 may be a built-in memory or an external memory card. The navigation camera 13 is electrically coupled to the processor 15, and includes a camera lens (such as one having a charge-coupled device (CCD) sensor or a complementary metal oxide semiconductor (CMOS) sensor) for capturing a real-time traffic image, and a sound pickup for recording sound when driving. The navigation camera 13 is operable to transmit the captured real-time traffic image together with the date and time of recording and the recorded sound to the processor 15.

The GPS system 14 is electrically coupled to the processor 15 and is operable to receive a GPS signal and transmit the GPS signal to the processor 15.

According to the GPS signal, the processor 15 is operable to determine a current position. Based on a destination, the processor 15 is operable to generate augmented reality navigation information, examples of which include but are not limited to a navigation electronic map (the current position being included in the electronic map), a navigation route, a road name, a direction indicator, a remaining travel distance to the destination, a remaining travel time to the destination, a road speed limit, etc.

Figure 2:
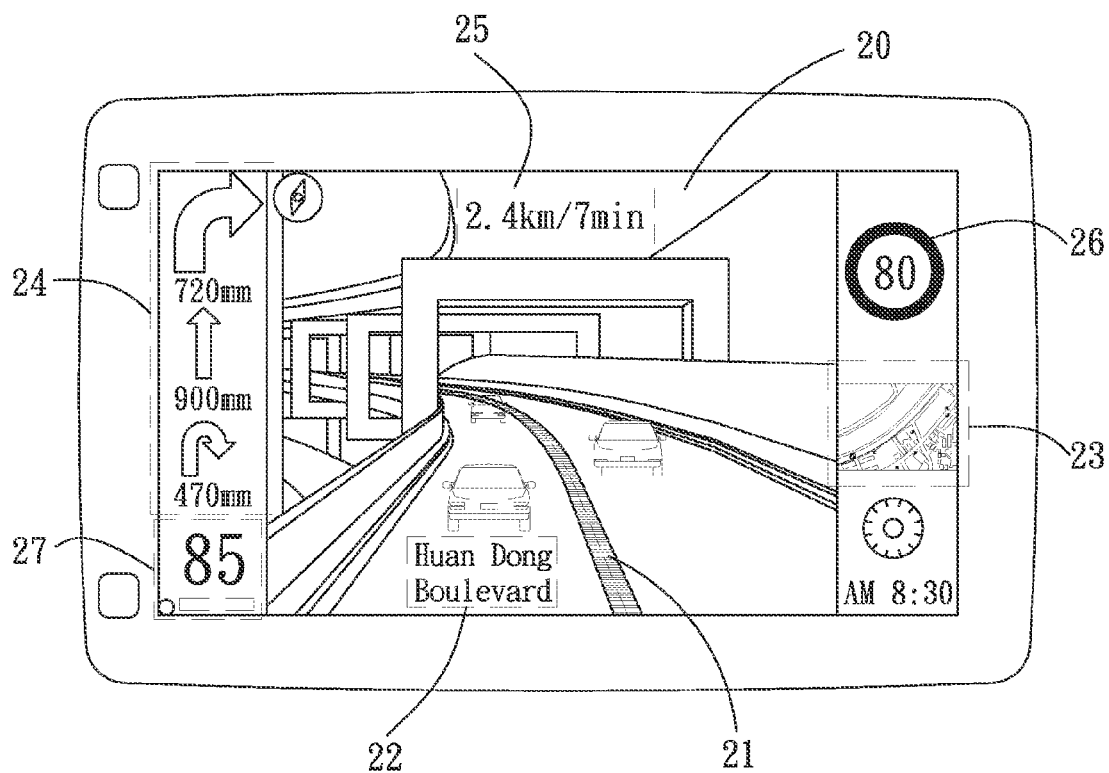
FIG. 2 is a schematic diagram illustrating an exemplary superimposed image shown on a display of the preferred embodiment.
Figure 3:
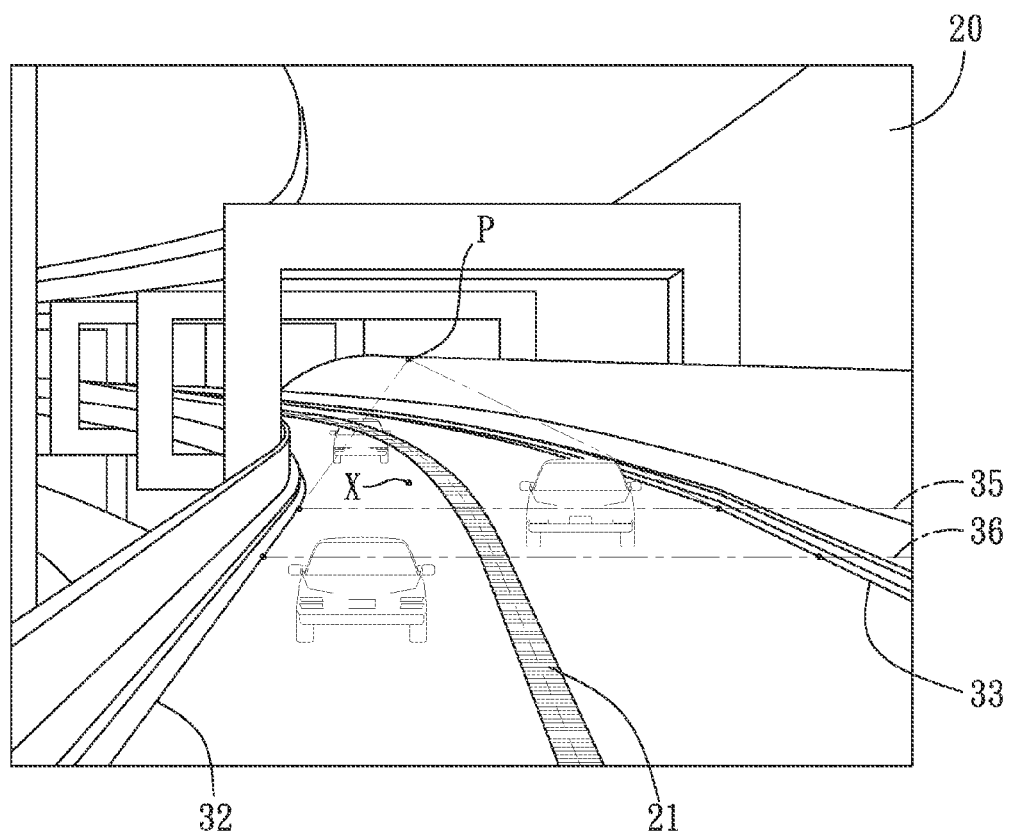
FIG. 3 is a schematic diagram illustrating a navigation route generated by a processor of the preferred embodiment.

When the navigation device is powered on, the processor 15 will first perform a calibration procedure. Referring to FIGS. 2 and 3, the processor 15 determines a reference point P of the real-time traffic image 20 received from the navigation camera 13. The reference point P is associated with a depth of field of the real-time traffic image 20 and may be an intersection point of left and right boundary lines 32, 33 on two sides of a road in the real-time traffic image 20. Based on the reference point P, the processor 15 then determines a viewing angle and a zoom scale of the real-time traffic image 20. The processor 15 subsequently adjusts a display scale and a display position of the navigation route 21 based on the viewing angle and the zoom angle. Further, the processor 15 is operable to superimpose the navigation route 21 on the display position of the real-time traffic image 20 to generate a superimposed image. The superimposed image is outputted by the processor 15 for viewing on the display 11 and is stored by the processor 15 in the recording medium 12.

In this embodiment, as shown in FIG. 3, the processor 15 first determines a Y-axis of the real-time traffic image 20 that passes through the reference point P. According to position relationship between the reference point P and another point X on the Y-axis (the point X could be the center of the Y-axis, and a viewing angle would be defined according to the position relationship such as the distance and whether the reference point P is located above or below the point X), the processor 15 is operable to automatically determine the viewing angle of the real-time traffic image 20, and adjust the viewing angle of the display of the navigation route 21 according to the viewing angle of the real-time traffic image 20.

The processor 15 further identifies a road in the real-time traffic image 20 and obtains respective widths at two predetermined positions of the road thus identified. Based on the viewing angle and a ratio between the two widths, the processor 15 determines the zoom scale of the real-time traffic image 20.

In this embodiment, the processor 15 includes an identification module 16. With reference to FIG. 3, the identification module 16 is operable to identify two boundary lines 32, 33 of the road in the real-time traffic image 20. The identification module 16 is further operable to determine the width at each of the two predetermined positions of the road by drawing the two horizontal lines 35, 36 each crossing one of the predetermined positions and defining the distance between two boundaries of the road on each of the horizontal lines 35, 36 as the two widths.

Moreover, the identification module 16 is further operable to identify two road edge lines of the road in the real-time traffic image 20 as the two boundary lines 32, 33. Alternatively, the identification module 16 is operable to identify junctions of the road in the real-time traffic image 20 with surrounding objects beside the road in the real-time traffic image 20 as two simulated boundary lines 32, 33.

The relationships between different reference points P and point X, the viewing angle and the zoom scale for different zoom factors of the camera lens of the navigation camera 13 may be pre-established in a look-up table stored in the navigation device. Those skilled in the art may readily appreciate that the viewing angle and the zoom scale of the real-time traffic image 20 may be determined by the processor 15 through other means, such as through the use of mathematical equations.

As shown in FIG. 2, the processor 15 is operable to superimpose a road name 22 of the road on the real-time traffic image 20 beside the navigation route 21 such that a driver is able to perceive clearly the current road he or she is driving on. The processor 15 is also operable to superimpose a navigation electronic map 23, a direction indicator 24, a remaining travel distance/remaining travel time to the destination 25, a road speed limit 26, and a current vehicle speed 27 on designated areas of the real-time traffic image 20.

Figure 4:
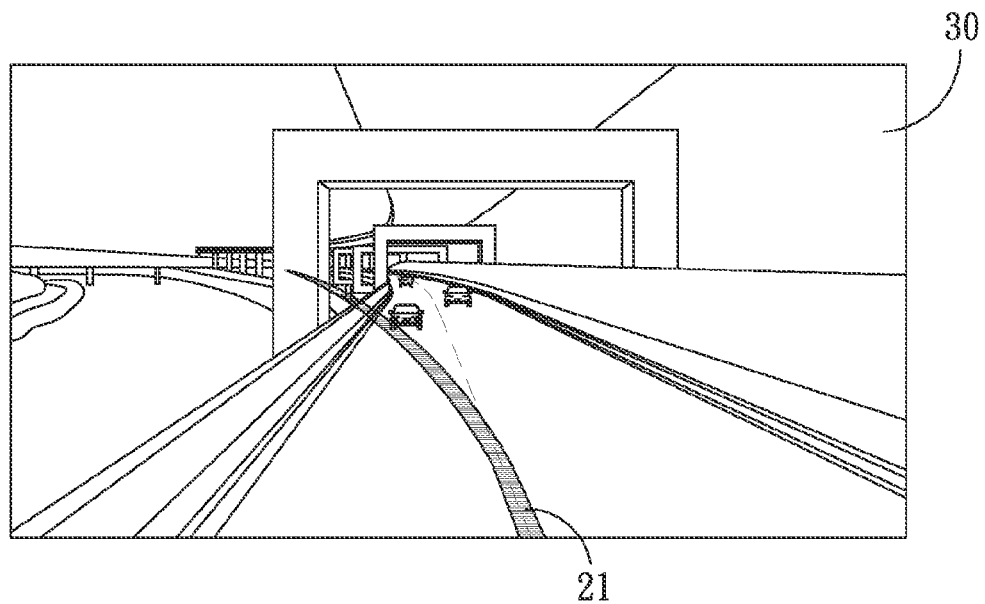
FIG. 4 is a schematic diagram illustrating a superimposed image in which a navigation route does not match a zoom factor of a camera lens.

When the zoom factor of the camera lens of the navigation camera 13 is changed by the user, the real-time traffic image 30 as captured by the camera lens of the navigation camera 13 changes, as shown in FIG. 4. If the processor 15 does not adjust correspondingly the display scale and the display position of the navigation route 21 to match the zoom factor of the camera lens, the navigation route 21 superimposed on the real-time traffic image 30 will not extend along the road and may be outside the range of the road.

Figure 5:
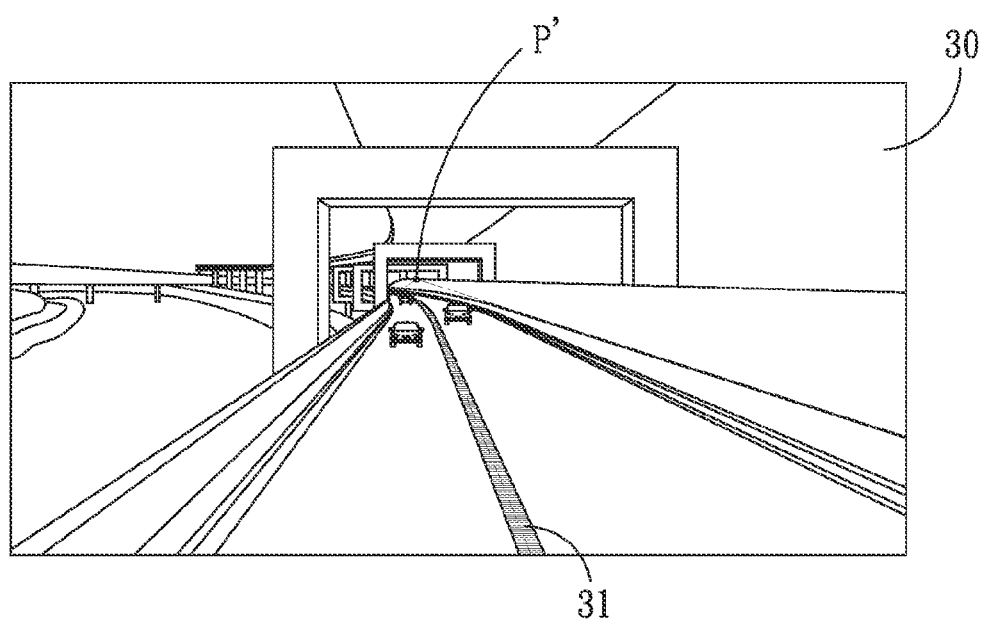
FIG. 5 is a schematic diagram illustrating a superimposed image in which a navigation route matches a zoom factor of a camera lens.

Therefore, as shown in FIG. 5, whenever the zoom factor of the camera lens of the navigation camera 13 is changed by the user, the processor 15 is operable to determine a new reference point P' of the real-time traffic image 30, determine the viewing angle and the zoom scale of the real-time traffic image 30, and adjust the display scale and the display position of the navigation route 31 before superimposing the navigation route 31 on the real-time traffic image 30 to ensure integrity of the superimposed image.

Alternatively, if the processor 15 is already aware of the range of available zoom factors of the camera lens of the navigation camera 13, the processor 15 may be configured beforehand with a relation between different map scales of the navigation route and different zoom factors of the navigation camera 13. Therefore, when the user adjusts the current zoom factor of the camera lens of the navigation camera 13, the processor 15 is operable to adjust the display scale and the display position of the navigation route according to the map scale that corresponds to the current zoom factor (i.e., a selected zoom factor) of the camera lens of the navigation camera 13, thereby dispensing with the need to recalculate the viewing angle and the zoom scale of the real-time traffic image and adjust the display scale and the display position of the navigation route based on the recalculated viewing angle and zoom scale.

It has thus been shown that this embodiment uses the real-time traffic image 20 captured in real-time for augmented reality navigation. The navigation image directly reflects real-time traffic conditions such that a driver can intuitively perceive the driving conditions, thereby increasing driving safety.

Furthermore, the navigation camera 13 additionally includes a GPS positioning device 131 that records GPS coordinates, an acceleration sensor 132 that detects vehicle acceleration, and a speedometer 133 that detects vehicle speed. The navigation camera 13 is operable to output these driving information to the processor 15, and the processor 15 is operable to superimpose the vehicle speed 27 on an area of the real-time traffic image 20 (see FIG. 2) for the driver's reference. The processor 15 is further operable to combine the real-time traffic image 20 superimposed with the navigation information, and the driving information detected by the navigation camera 13 into a single image file, such as an AVI file, for storage in the recording medium 12. Hence, a user is able to playback the image file on a personal computer without requiring proprietary vendor support software and watch the captured real-time traffic image 20 with the navigation information from the navigation camera 13 superimposed thereon. By virtue of the navigation device with augmented reality navigation functionality of this invention, manually matching the navigation camera and the display of the navigation information including manually adjusting the position of the navigation device or manually fine tuning the resolution of the display of the navigation information would not be necessary even if any movement of the navigation device is made under the normal operation of the navigation device such as inputting the destination. In addition, occupied space in a vehicle may be reduced to alleviate obstructed view through a vehicle windshield. Moreover, through display of a real-time traffic image captured in real-time and superimposed with navigation information from a navigation camera, a driver can intuitively perceive the driving conditions so that driving safety is increased.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A navigation device comprising:
   a display;
   a recording medium;
   a navigation camera including a camera lens and operable to capture at least a real-time traffic image;
   a global positioning system (GPS) system for receiving at least a GPS signal; and
   a processor coupled electrically to said display, said recording medium, said navigation camera and said GPS system, said processor being operable to
      determine a current position based on the GPS signal,
      generate navigation information including a navigation route based on a destination,
      determine a reference point of the real-time traffic image received from said navigation camera, the reference point being associated with a depth of field of the real-time traffic image,
      determine an viewing angle and a zoom scale of the real-time traffic image based on the reference point,
      adjust a display scale and a display position of the navigation route based on the viewing angle and the zoom scale,
      superimpose the navigation route on the display position of the real-time traffic image to generate a superimposed image,
      output the superimposed image on said display, and
      store the superimposed image in said recording medium.

2. The navigation device as claimed in claim 1, wherein the navigation information further includes a road name, and said processor is operable for indicating the road name on a road in the real-time traffic image.

3. The navigation device as claimed in claim 1, wherein said processor is operable to
   determine the viewing angle of the real-time traffic image according to position relationship between the reference point and another point on a Y-axis of the real-time traffic image, the Y-axis passing through the reference point, said another point being the center point of the Y-axis on the display screen, and
   adjust viewing angle of the navigation route according to the viewing angle of the real-time traffic image.

4. The navigation device as claimed in claim 1, wherein said processor is operable to
   identify a road in the real-time traffic image,
   determine respective widths at two predetermined positions of the road, and
   determine the zoom scale based on the viewing angle, the distance between the two predetermined positions, and a ratio between the two widths.

5. The navigation device as claimed in claim 4, wherein said processor includes an identification module for identifying two boundary lines of the road in the real-time traffic image, and for determining the widths at the two predetermined positions of the road by drawing two horizontal lines each crossing one of the predetermined positions and defining the distance between two boundaries of the road on each of the horizontal lines as the two widths.

6. The navigation device as claimed in claim 5, wherein the two boundary lines are two road edge lines of the road in the real-time traffic image.

7. The navigation device as claimed in claim 5, wherein the two boundary lines are junctions of the road in the real-time traffic image with surrounding objects beside the road in the real-time traffic image.

8. The navigation device as claimed in claim 1, wherein said processor is configured with a relation between map scales of the navigation route and available zoom factors of the camera lens, and is operable to adjust the display scale and the display position of the navigation route superimposed on the real-time traffic image according to the map scale that corresponds to a selected one of the zoom factors of the camera lens.

9. The navigation device as claimed in claim 1, wherein the navigation information further includes a navigation electronic map, a direction indicator, a remaining travel distance to the destination, and a remaining travel time to the destination, and said processor is further operable to superimpose at least one of the navigation electronic map, the direction indicator, the remaining travel distance to the destination, and the remaining travel time to the destination on the real-time traffic image.

10. The navigation device as claimed in claim 1, wherein said navigation camera includes a GPS positioning device that records GPS coordinates, an acceleration sensor that detects vehicle acceleration, and a speedometer that detects vehicle speed, and said processor is further operable to
   superimpose the vehicle speed on the real-time traffic image, and
   combine the real-time traffic image superimposed with the navigation information, the GPS coordinates, the vehicle acceleration and the vehicle speed into a single image file for storing in said recording medium.

11. A navigation device comprising:
   a display;
   a recording medium;
   a navigation camera including a camera lens and operable to capture at least a real-time traffic image;
   a global positioning system (GPS) system for receiving at least a GPS signal; and
   a processor coupled electrically to said display, said recording medium, said navigation camera and said GPS system, said processor being operable to
      determine a current position based on the GPS signal,
      generate navigation information including a navigation route based on a destination, determine a reference point of the real-time traffic image received from said navigation camera, the reference point being associated with a depth of field of the real-time traffic image, determine an viewing angle and a zoom scale of the real-time traffic image based on the reference point, adjust a display scale and a display position of the navigation route based on the viewing angle and the zoom scale, superimpose the navigation route on the display position of the real-time traffic image to generate a superimposed image, output the superimposed image on said display, and store the superimposed image in said recording medium, wherein said processor is operable to determine the viewing angle of the real-time traffic image according to position relationship between the reference point and another point on a Y-axis of the real-time traffic image, the Y-axis passing through the reference point, said another point being the center point of the Y-axis on the display screen, and adjust viewing angle of the navigation route according to the viewing angle of the real-time traffic image; and wherein said processor is further operable to identify a road in the real-time traffic image, determine respective widths at two predetermined positions of the road, and determine the zoom scale based on the viewing angle, the distance between the two predetermined positions, and a ratio between the two widths.

* * * * *